Aug. 5, 1941.  J. P. SCHWARTZ ET AL  2,251,293
HYDRAULIC CAR LIFT
Filed April 24, 1939  5 Sheets-Sheet 2
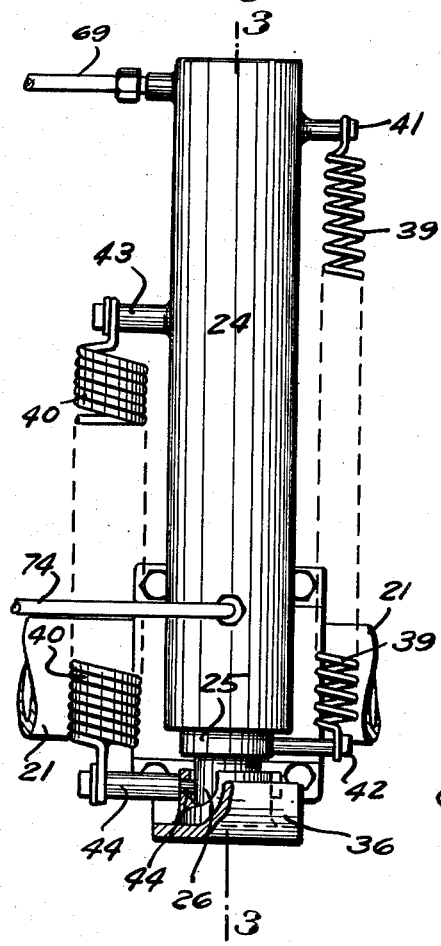
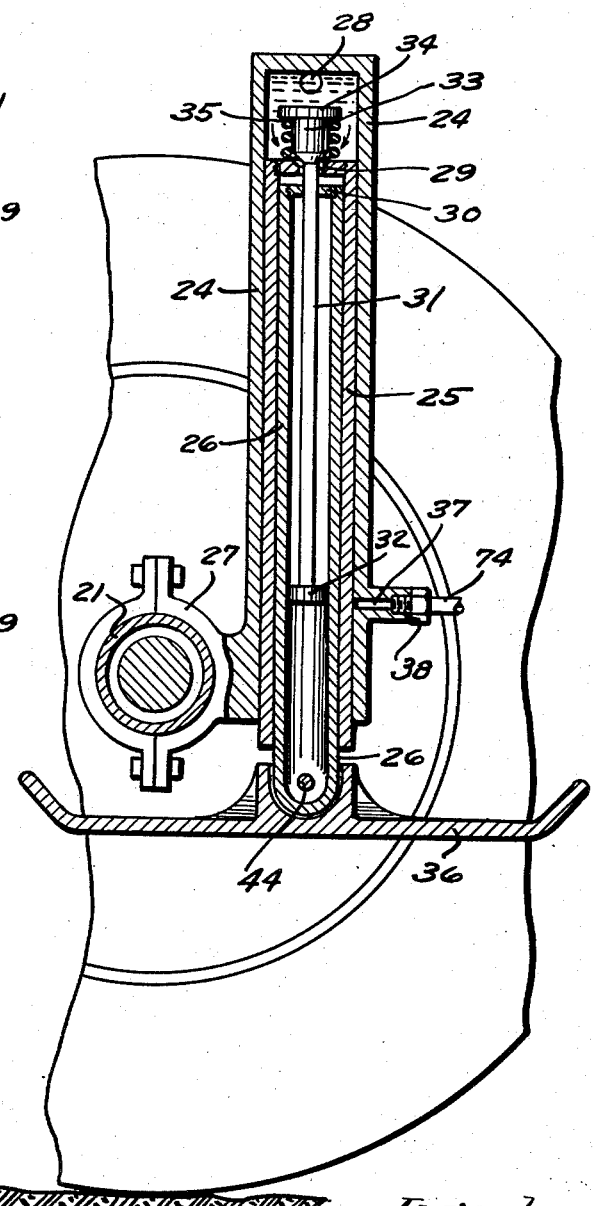
Inventors
Joseph P. Schwartz
John P. McDonald
Stanley H. McDonald
Thomas J. McDonald
By their Attorneys Aug. 5, 1941.   J. P. SCHWARTZ ET AL   2,251,293
HYDRAULIC CAR LIFT
Filed April 24, 1939   5 Sheets-Sheet 3
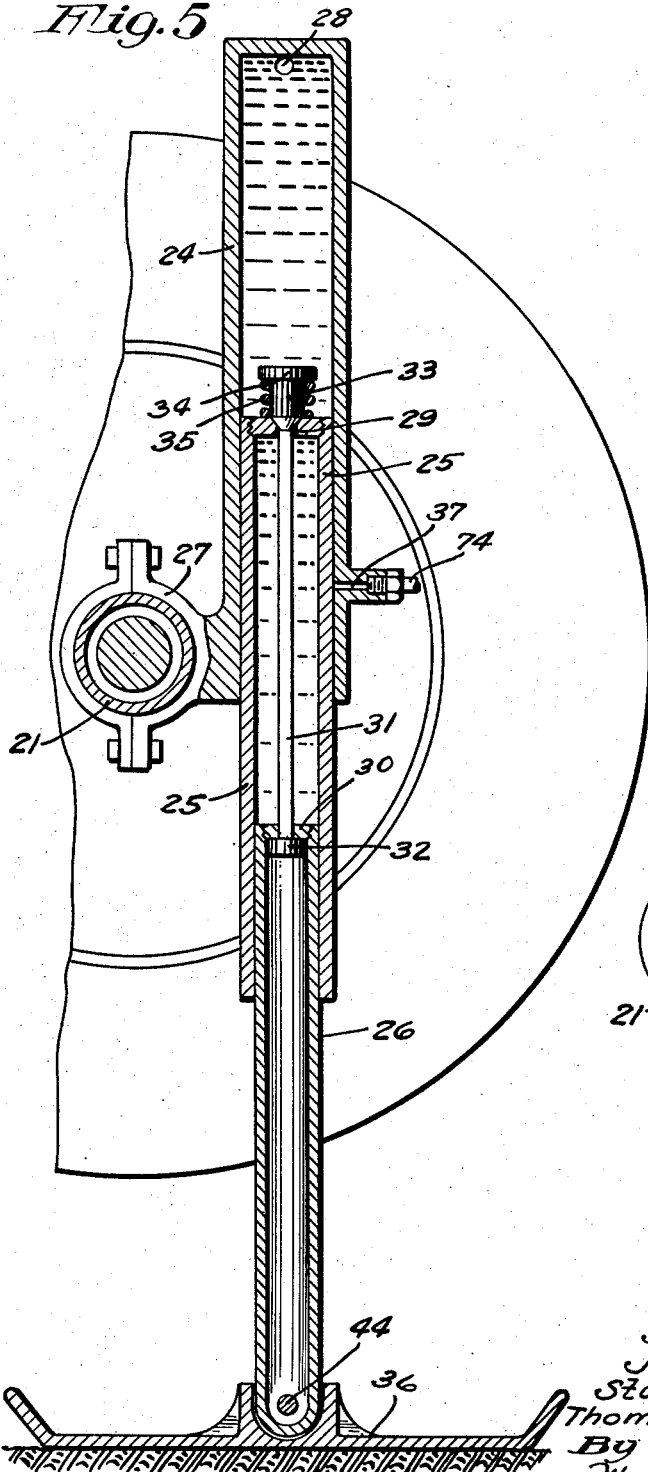
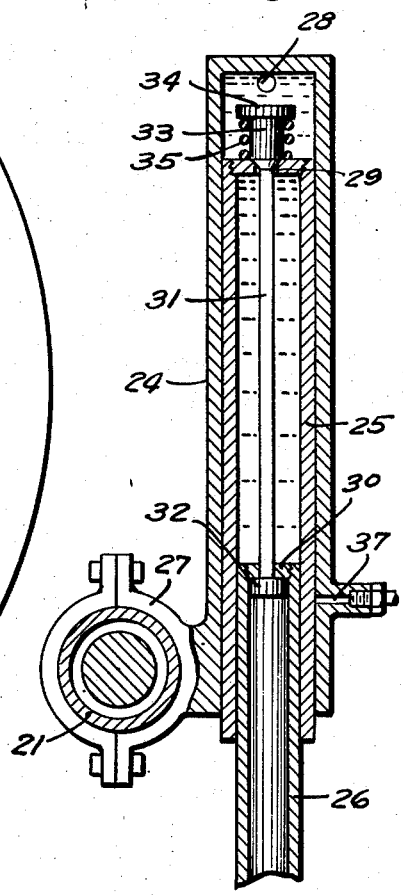
Inventors
Joseph P. Schwartz
John P. McDonald
Stanley H. McDonald
Thomas J. McDonald
By their Attorneys

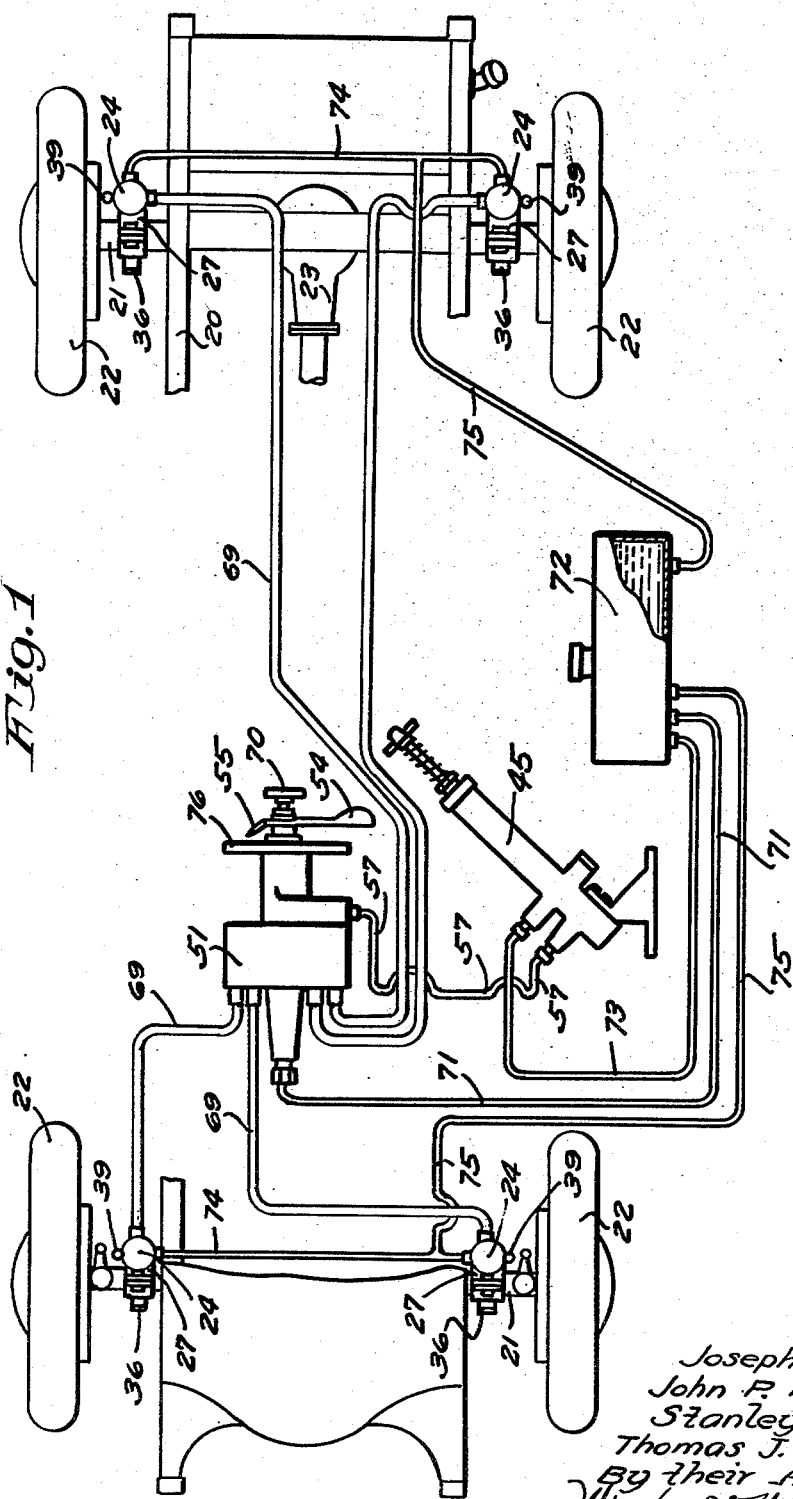

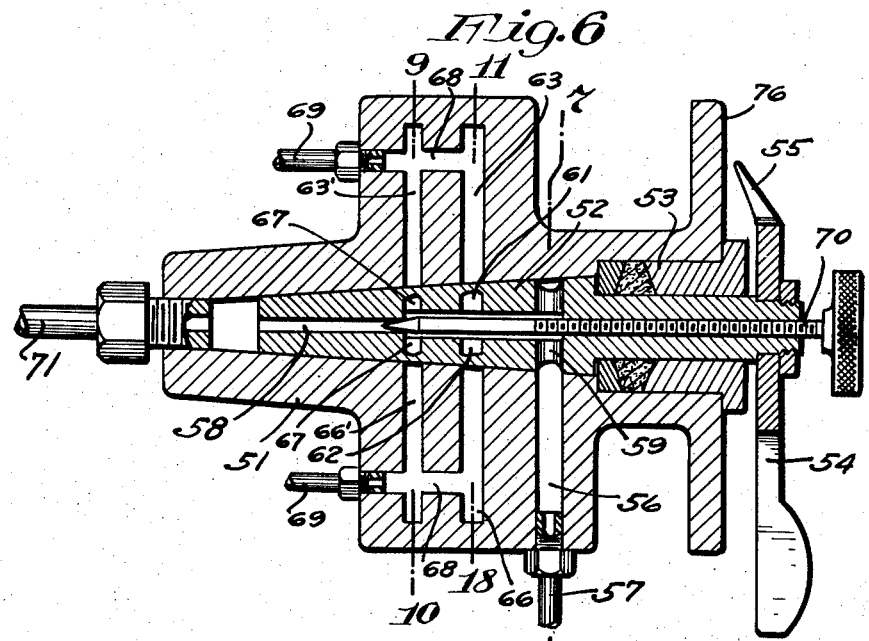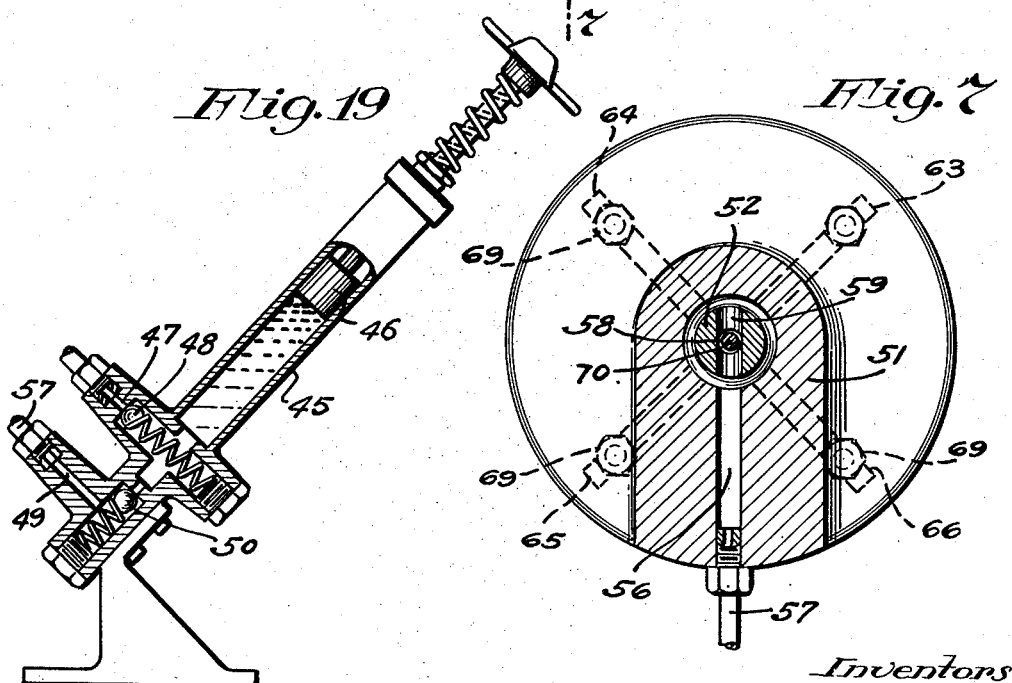

Aug. 5, 1941.  J. P. SCHWARTZ ET AL  2,251,293
HYDRAULIC CAR LIFT
Filed April 24, 1939   5 Sheets—Sheet 5
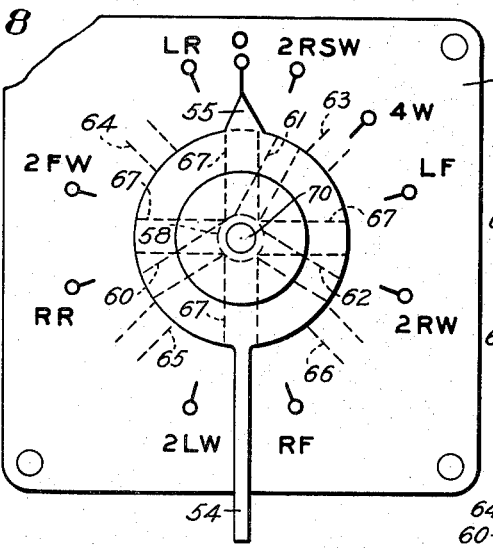
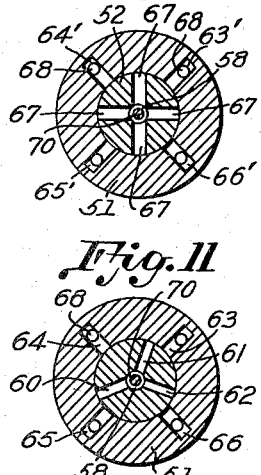
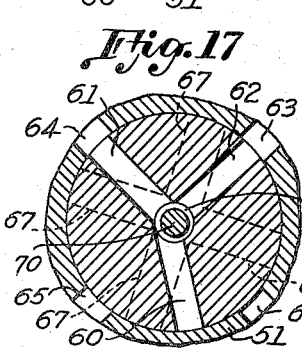
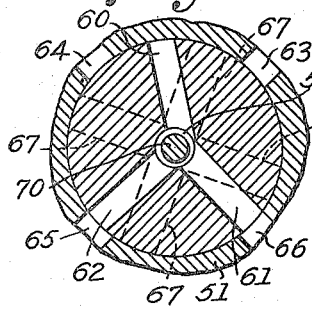
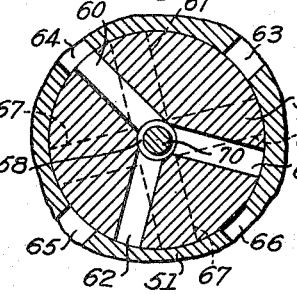
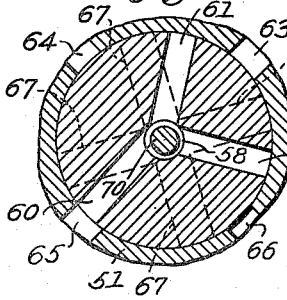
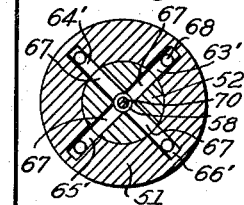
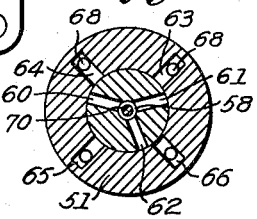
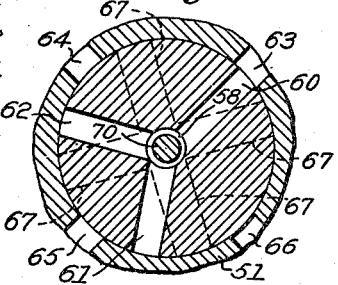
Inventors:
JOSEPH P. SCHWARTZ
JOHN P. McDONALD
STANLEY H. McDONALD
THOMAS J. McDONALD
By Michael & Michael
Attorneys.

Patented Aug. 5, 1941

2,251,293

UNITED STATES PATENT OFFICE 2,251,293

HYDRAULIC CAR LIFT

Joseph P. Schwartz, John P. McDonald, Stanley H. McDonald, and Thomas J. McDonald, St. Paul, Minn.

Application April 24, 1939, Serial No. 269,668

4 Claims. (Cl. 121—46)

This invention relates to means for lifting the wheels of automobiles or motor propelled vehicles. It provides lifting jacks which in themselves are novel in construction and operation.

These lifting jacks, of which there are four, are applied to the ends of the front and rear axles and are arranged to be hydraulically or fluid actuated under power afforded by a pump. This pump may be of any suitable construction and may be operated either manually or from the power of the engine of the motor propelled vehicle to which the jacks are applied.

The jacks are arranged to be selectively operated by valve mechanism of novel construction. In the complete and preferred arrangement the four jacks may be selectively actuated, under control of the valve mechanism, to accomplish the following operations, to wit: the left front jack may be actuated to lift only the left front wheel; the right front jack may be actuated to lift only the right front wheel; the left rear jack may be actuated to lift only the left rear wheel; the right rear jack may be actuated to lift only the right rear wheel; the two front jacks may be simultaneously operated to lift the two front wheels; the two rear jacks may be simultaneously operated to lift the two rear wheels; the two left side jacks may be simultaneously operated to lift the two left side wheels, to wit, the left front and rear wheels; and the two right side jacks may be simultaneously operated to lift the two right side wheels, to wit, the front rear right side wheels. Normally, of course, the valve will close all of the ports, and all of the jacks will be retracted or drawn up into inoperative positions high up in the chassis of the machine where the jacks will clear anything that the axles and transmission casings of the vehicle will clear in the travel of the machine.

In the accompanying drawings which illustrate the invention in its preferred embodiment like characters indicate like parts throughout the several views.

Referring to the drawings:

Fig. 1 is a plan view showing the parts of the chassis of an automobile or motor propelled vehicle and illustrating graphically the application of the jacks to the car, the valve mechanism, the pump and fluid circulating connections;

Fig. 2 is a front elevation showing one of the hydraulic jacks and a portion of an axle to which it is applied;

Fig. 3 is a section taken on the line 3—3 of Fig. 2 and showing a part of a wheel adjacent to which the jack is applied on the axle, the jack being contracted or drawn up;

Fig. 4 is a view corresponding in the line of its section to Fig. 3 with some parts broken away and showing the jack part way extended;

Fig. 5 is a view corresponding to Fig. 3 but showing the jack extended in contact with the ground to raise the wheel;

Fig. 6 is an axial section showing the selecting valve mechanism;

Fig. 7 is a section taken on the line 7—7 of Fig. 6;

Fig. 8 is a view in elevation looking at the valve mechanism of Fig. 6 in the direction of the right toward the left;

Figs. 9 and 10 are sections taken on the line 9—10 of Fig. 6 but illustrating different position of the valve core;

Figs. 11 to 18 inclusive are sections taken on the line 11—18 of Fig. 6, illustrating different position of the valve core; and Fig. 19 is a view partly in side elevation and partly in axial section showing a manually operated pump as one means for affording the power necessary to circulate the oil or other hydraulic medium.

Fig. 1 in plan shows the location of the several jacks in respect to the axles and wheels of the vehicle. Figs. 2 to 5 inclusive indicate the construction, operation and manner of application of the jacks to the vehicle axles. At this point it may be stated that these jacks are applied to the axles so that when raised or contracted the ground engaging lower portions of the jacks will be closely adjacent to the axles and above the transmission mechanism.

Of the parts of the motor propelled vehicle insofar as desirable for the purpose of this case to note, the numeral 20 indicates the chassis frame, the numeral 21 the front and rear axles, the numeral 22 the front and rear wheels and the numeral 23 the differential casing of the transmission mechanism. The other parts illustrated on Fig. 1 are diagrammatically indicated.

Each of the jacks comprises three sections, to wit: an outer cylinder 24, intermediate cylinder 25 and a third or inner cylinder 26. The outer cylinders 24 are fixed elements of the jacks and, as shown, are rigidly secured to the ends of the axles 21 by clamping brackets 27, best shown in Figs. 3, 4, and 5. The upper ends of the cylinders 24 are closed except for a supply port 28. At their upper ends the cylinders 25 have heads formed with axial ports 29. The cylinders 26 are closed at their lower ends and at their upper ends are provided with heads 30 through which work axially located valve stems 31, which at their lower ends are provided with heads 32 that work in the inner cylinders 26. The upper ends of valve stems 31 also work through the heads of the valve seats 29 in the heads of the cylinders 25, and just above said seats said valve stems are provided with valves 33. The valve heads 33 are provided with flanges 34 between which and the heads of cylinders 25, light coiled springs 35 are compressed.

To give the jacks ample bearing even on soft ground, ground engaging shoes 36 are pivoted or loosely applied to the lower ends of the cylinders 26. At points considerably above their lower ends, the outer fixed cylinders 24 are provided with ports 37 shown as formed in nipples 38.

Referring to Fig. 2, it will be noted that the extensible jacks are normally held contracted as shown in Fig. 3 by a pair of coiled springs 39 and 40. Spring 39 at its upper end is attached to a projection 41 on the upper end of cylinder 24, and at its lower end to a stud 42 that projects from the lower end of cylinder 25. Spring 40 at its upper end is attached to a projection 43 on cylinder 24, and at its lower end to the projecting end of pin 44, which is conveniently used as the pivotal connection between the shoe 36 and the lower end of cylinder 26.

Figs. 1 and 19 show the manually operated pump of the system. Of the parts of this pump, the numeral 45 indicates the cylinder and the numeral 46 indicates the spring retracted piston. This pump, as shown, receives the oil or hydraulic fluid through a port 47 having a spring closed inwardly opening check valve 48; and the discharge of oil from the pump is through a port 49 having a spring closed outwardly opening check valve 50. This manually operated pump, as already clearly indicated, is shown chiefly for illustrative purpose and may be in other suitable form either manually operated or power driven.

The valve mechanism for controlling the flow of the oil or hydraulic fluid to and from the several hydraulic jacks to perform the several functions above noted is shown in Figs. 1 to 18 inclusive. This valve mechanism includes a valve casing 51 and rotatively mounted therein is a valve core 52, which latter, as shown, works through a stuffing box 53 and is provided at its outer end with an operating handle 54 that carries a pointing finger 55. Valve casing 51 has an intake port 56 that is connected by a pipe 57 to the outlet port 49 of the pump. Valve core 52 has an axial passage 58 that is in constant connection with intake port 56 through an annular groove formed with radial oil passages 59.

The axial passage 58 of the valve core has three outlet ports 60, 61 and 62 circumferentially spaced, and arranged to co-operate with outlet ports 63, 64, 65 and 66 formed in valve casing 51. Also axial passage 58 of core 52 is provided in a plane offset from the plane of the ports 60, 61 and 62 with four ports 67 that co-operate with four ports 63', 64', 65' and 66' that are cross connected by passages 68 to the respective ports 63, 64, 65 and 66. The four ports 63', 64', 65' and 66' are connected each to the port 28 of one of the jacks by pipes 69.

Working with threaded engagement axially through the valve core 52 is a needle valve 70, the point of which normally closes the axial passage 58 of said valve core 52 at a point beyond the controlling ports of valve above described. The end of valve casing 51 is connected by a pipe 71 to a closed oil fluid supply tank 72 that will be carried on the chassis or any other part of the running gear.

The intake port 47 of the pump is connected to the tank 72 by a pipe 73. The relief ports 37 of the several cylinders 24 are connected to the tank 72 by cross pipe connections 74 and return pipes 75. As shown in Fig. 8, the pointer or finger 55 of valve actuating lever 54 co-operates with graduated marks on a dial plate 76 which is marked in a manner that will appear in the description of the operation.

*Operation*

Fig. 3 best shows the raised or retracted and normal condition of the jacks. When oil or fluid under pressure is delivered to the upper end of the fixed and outer cylinder 24 through port 28, the oil will flow through the valve seat or passage 29 in the head of intermediate cylinder 25, and will act on the upper end or head 30 of the inner cylinder 26, and this will force said inner cylinder 26 downward while the intermediate cylinder 25 remains stationary in the outer cylinder 24. The springs 39 and 40 are of a certain relative strength which will insure initial movement of the cylinder 26 prior to movement of cylinder 25. When inner cylinder 26 has reached the position shown in Fig. 4, valve stem head 32 will be engaged by the head 30 of cylinder 26 thereby causing valve 33 to close valve seat 29 against the tension of spring 35 and when this occurs the further delivery of the oil into the upper end of outer cylinder 24 will cause the intermediate cylinder to move downward carrying with it the inner cylinder 26 due to the oil caged within the cylinder 25. When the shoe 26 has been contacted with the ground the further extension of the jack will cause the axle and the wheel adjacent the jack to be raised above the ground to the proper extent controlled by the valve mechanism above noted and the operation of which will presently be described. If, by any chance, the cylinder 25 should be moved downward in cylinder 24 to a point beyond the relief port 37, then the oil will escape through said port 37 and pipes 74 and 75 back into storage tank or reservoir 72. This relief of the oil pressure prevents the cylinder 25 from being forced completely out of the cylinder 24, and moreover prevents breakage that might possibly occur under continued pressure. Also, the manner in which, under the valve control, the jacks are contracted or restored to normal position will be described later on in connection with the action of the control valve mechanism.

The operation of the controlling valve mechanism will now be traced. Fig. 8 shows the normal position of the valve operating lever or hand piece 54 with the pointer 55 at the zero mark on the dial 76. In this normal position of the valve all of the controlling ports to the valve mechanism are closed. In all of the positions of the valve core 52 for controlling the delivery of the motive fluid to extend the jack or jacks, needle valve 70 will be set to close the delivery portion of the axial conduit 58 of said valve core.

When the lever 54 is turned so that its pointer or finger 55 is aligned with the dial line marked 4W, the valve core will be set in the position indicated by Figs. 10 and 12. Here it will be noted that all three of the ports 60, 61 and 62 are closed while the four ports 67 are then aligned with the four delivery ports 63, 64, 65 and 66, and this will cause the delivery of oil simultaneously to all four of the jacks with the result that all four wheels of the vehicle will be raised from the ground. With this setting of the valve mechanism the flow of oil will be from pump through pipe 57, passage 56, port 59 to receiving end of axial passage 58 (but not to the delivery end of passage 58), through the four ports 67, four ports 63', 64', 65' and 66' and through the four pipes 69 to the ports 28 of the four jacks.

When lever 54 is turned so that its pointer 55 is aligned with the dial line marked LF the valve core will then be set as shown in Fig. 13, and the oil will then be delivered only to the left front jack causing only the left front wheel to be raised. The flow of the oil from pump to this left front jack will then be as follows; through pipe 57, passages 56, 59 and 58, through ports 60 and 64, passage 68 and the pipe 69 that leads to said left front jack.

When the lever 54 is turned so that its pointer 55 is aligned with the dial line marked LR, the valve core will be in the position shown in Fig. 14 and the flow of oil from the pump will then be through pipe 57, passages 56, 59 and 58, ports 60 and 65 and passage 68 and pipe 69 that leads to the left rear jack so that the oil will then be delivered to said left rear jack and the left rear wheel only will be raised.

When lever 54 is turned so that its pointer 55 is aligned with the dial line marked RR, see Fig. 15, the flow of the oil will then be from the pump through pipe 57, passages 56, 59, 58, ports 60 and 66, and passage 68 and the pipe 69 that leads to the right rear jack so that by this setting of the valve mechanism only the right rear jack will be operated and only the right rear wheel will be raised.

When the lever 54 is set so that the pointer 55 is aligned with the dial line marked RF, see Fig. 16, the flow of the oil from the pump will then be through pipe 57, passages 56, 59, 58, ports 60 and 63, and passage 68 and pipe 69 that leads to the right front jack so that only the right front jack will be actuated and only the right front wheel will be lifted.

When lever 54 is moved so that the pointer 55 is aligned with the dial line marked 2FW, see Fig. 17, the flow of the oil from the pump will then be through pipe 57, passages 56, 59, 58, ports 61 and 62 and ports 63 and 64 through passages 68 and the two pipes 69 that lead to the two front jacks so that then the two front jacks will be simultaneously operated and the two front wheels will be lifted.

When lever 54 is moved so that the pointer 55 is aligned with the dial line marked 2RW, see Fig. 18, the flow of the oil from the pump will then be through pipe 57, passages 56, 59, 58, ports 61 and 62 and ports 65 and 66 and passages 68 and the two pipes 69 that lead to the two rear jacks so that then the two rear jacks will be simultaneously operated and the two rear wheels will be raised.

When the lever 54 is moved so that the pointer 55 is aligned with the dial line marked 2LW, the two ports 61 and 62 will be in registration with the ports 64 and 65 so that the flow of the oil then instead of being either to the two front or the two rear jacks will be to the two left hand jacks, to wit; the front left and the rear left jacks with the result, of course, that when the two left hand wheels will be simultaneously raised.

When the lever 54 is moved so that the pointer 55 is aligned with the dial line marked 2RSW, the two right side wheels, the flow of the oil from the pump will be from the two ports 61 and 62 which ports will be in registration with the ports 63 and 66 so that the flow of the oil from the pump will then be to the two right side jacks, to wit; the right front and the right rear jacks, so that the two right side wheels will be simultaneously raised.

It will be noted in all of the positions in the valve core, except the position for simultaneously operating the four jacks, that the valve core will keep ports 63, 64', 65' and 66' closed. It should also be remembered that the four ports 67 of the valve core function only when the valve core is set to cause simultaneous operation of all four jacks, and that the ports 60, 61 and 62 function in all of the above noted selective jack actions, except when the said four jacks are simultaneously operated.

In all of the above described operations the needle valve 70 will close the delivery portion of the passage 58 so there will be no flow of oil either in one direction or the other through the pipe 71. After the valve core has been set in any one of the positions above described, except the neutral position, the jack or jacks last operated can be released and restored to normal or contracted positions, by the springs 39 and 40, simply by opening the needle valve 70. This will allow the oil from the said jack or jacks to flow backward through the pipe or pipes 69, through passages 68 and through one or the other of the ports 63, 64, 65 or 66 and through one or the other of the ports 60, 61 or 62 to the core axial passage 58 and from thence through pipes 71 back to reservoir 72.

What we claim is:

1. A hydraulic jack involving a relatively fixed outer cylinder, an intermediate cylinder telescoped within said outer cylinder, an inner cylinder telescoped within said intermediate cylinder, said intermediate cylinder in its head having a valve seating port, a yieldingly retracted normally open valve for closing said valve seat, said valve having an axial stem extended through the head of said inner cylinder, said inner cylinder being operative on said stem to close said valve when said inner cylinder has been extended to a certain extent, and thereafter to cause further delivery of the liquid into said outer cylinder, to simultaneously move downward said intermediate and inner cylinders.

2. A hydraulic jack involving a relatively fixed outer cylinder, an intermediate cylinder telescoped within said outer cylinder, an inner cylinder telescoped within said intermediate cylinder, said intermediate cylinder in its head having a valve seating port, a yieldingly retracted normally open valve for closing said valve seat, said valve having an axial stem extended through the head of said inner cylinder, said inner cylinder being operative on said stem to close said valve when said inner cylinder has been extended to a certain extent, and thereafter to cause further delivery of the liquid into said outer cylinder, to simultaneously move downward said intermediate and inner cylinders, said inner cylinder at its lower end having a ground engaging shoe.

3. A hydraulic jack involving a relatively fixed outer cylinder, an intermediate cylinder telescoped within said outer cylinder, an inner cylinder telescoped within said intermediate cylinder, said intermediate cylinder in its head having a valve seating port, a yieldingly retracted normally open valve for closing said valve seat, said valve having an axial stem extended through the head of said inner cylinder, said inner cylinder being operative on said stem to close said valve when said inner cylinder has been extended to a certain extent, and thereafter to cause further delivery of the liquid into said outer cylinder, to simultaneously move downward said intermediate and inner cylinders, said outer cylinder near its lower end having a relief port through which the fluid will escape when said intermediate cylinder is moved downward beyond said relief port.

4. The structure defined in claim 1 in which said valve is normally retracted by a spring interposed between the same and the head of said intermediate cylinder, and said valve stem is provided with a head located within said inner cylinder and arranged to be engaged by the head of the latter.

JOSEPH P. SCHWARTZ.
JOHN P. McDONALD.
STANLEY H. McDONALD.
THOMAS J. McDONALD.